(12) United States Patent
Moll et al.

(10) Patent No.: US 6,499,789 B2
(45) Date of Patent: Dec. 31, 2002

(54) FILLER INLET COMPARTMENT LID OPERATING SYSTEM

(75) Inventors: Patrick Moll, Munich (DE); Heiko Goehr, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/852,675

(22) Filed: May 11, 2001

(65) Prior Publication Data

US 2002/0008402 A1 Jan. 24, 2002

(30) Foreign Application Priority Data

May 12, 2000 (DE) .......................................... 100 23 382

(51) Int. Cl.$^7$ .............................................. B62D 25/00
(52) U.S. Cl. .......................... 296/97.22; 292/DIG. 25; 292/28
(58) Field of Search ..................... 296/97.22; 292/28, 292/DIG. 25; 123/198 B; 138/89; 307/10.1

(56) References Cited

U.S. PATENT DOCUMENTS

| | | | | |
|---|---|---|---|---|
| 3,895,506 A | * | 7/1975 | Gallego | 296/97.22 |
| 3,915,491 A | * | 10/1975 | Montgomery | 296/97.22 |
| 4,266,816 A | * | 5/1981 | Mukai et al. | 292/DIG. 25 |
| 4,331,353 A | * | 5/1982 | Yazawa et al. | 292/28 |
| 4,418,553 A | * | 12/1983 | Applegate | 296/97.22 |
| 4,458,930 A | * | 7/1984 | Goike et al. | 296/97.22 |
| 4,848,509 A | * | 7/1989 | Bruhnke et al. | 123/198 B |
| 5,044,678 A | * | 9/1991 | Detweiler | 296/97.22 |
| 5,066,062 A | * | 11/1991 | Sekulovski | 296/97.22 |
| 5,234,122 A | * | 8/1993 | Cherng | 296/97.22 |
| 5,253,920 A | * | 10/1993 | Eldridge | 296/97.22 |
| 5,520,431 A | * | 5/1996 | Kapes et al. | 296/97.22 |
| 5,533,766 A | * | 7/1996 | Farber | 296/97.22 |
| 5,544,780 A | * | 8/1996 | Jye | 292/DIG. 25 |
| 5,836,638 A | * | 11/1998 | Slocum | 296/97.22 |
| 5,884,958 A | * | 3/1999 | Oddenino | 296/97.22 |
| 5,906,405 A | * | 5/1999 | Cooper | 296/97.22 |
| 5,988,238 A | * | 11/1999 | Palvolgyi | 296/97.22 |
| 6,003,558 A | * | 12/1999 | Neto et al. | 138/89 |
| 6,007,141 A | * | 12/1999 | Thomas et al. | 296/97.22 |
| 6,011,484 A | * | 1/2000 | Dietl et al. | 307/10.1 |
| 6,234,555 B1 | * | 5/2001 | Emmerich et al. | 296/97.22 |
| 6,234,556 B1 | * | 5/2001 | Janssen | 296/97.22 |
| 6,234,557 B1 | * | 5/2001 | Bae | 296/97.22 |

FOREIGN PATENT DOCUMENTS

| | | | |
|---|---|---|---|
| DE | 2329015 A1 | * | 1/1975 |
| DE | 42 43883 A1 | * | 6/1994 |
| DE | 19832910 A1 | | 1/1999 |
| DE | 198 41 553 C1 | * | 3/2000 |
| DE | 19858261 A1 | | 6/2000 |
| DE | 19860401 A1 | | 6/2000 |
| EP | 0806317 A1 | | 11/1997 |
| EP | 0820890 A2 | | 1/1998 |
| EP | 0 990 548 A2 | * | 9/1998 |
| EP | 0958956 A1 | | 11/1999 |
| FR | 2 852 340 | * | 5/1985 |
| WO | WO 98/04427 | | 2/1998 |

* cited by examiner

*Primary Examiner*—Kiran Patel
(74) *Attorney, Agent, or Firm*—Crowell & Moring LLP

(57) ABSTRACT

A system is provided in order to automatically close a filler inlet compartment lid of a car when the lid is in an unintended open position. When predefined signals which are considered to indicate the termination of a refueling operation occur, the system activates a filler inlet compartment lid closing mechanism so that the filler inlet compartment lid is automatically closed and locked. This can take place when the filler inlet compartment lid is completely open or when the lid is in an only slightly lifted intermediate position. The filler inlet compartment lid may reach such a slightly lifted intermediate position, for example, in a drive-through car wash when triggered by the pressure of the car wash brushes.

8 Claims, 2 Drawing Sheets

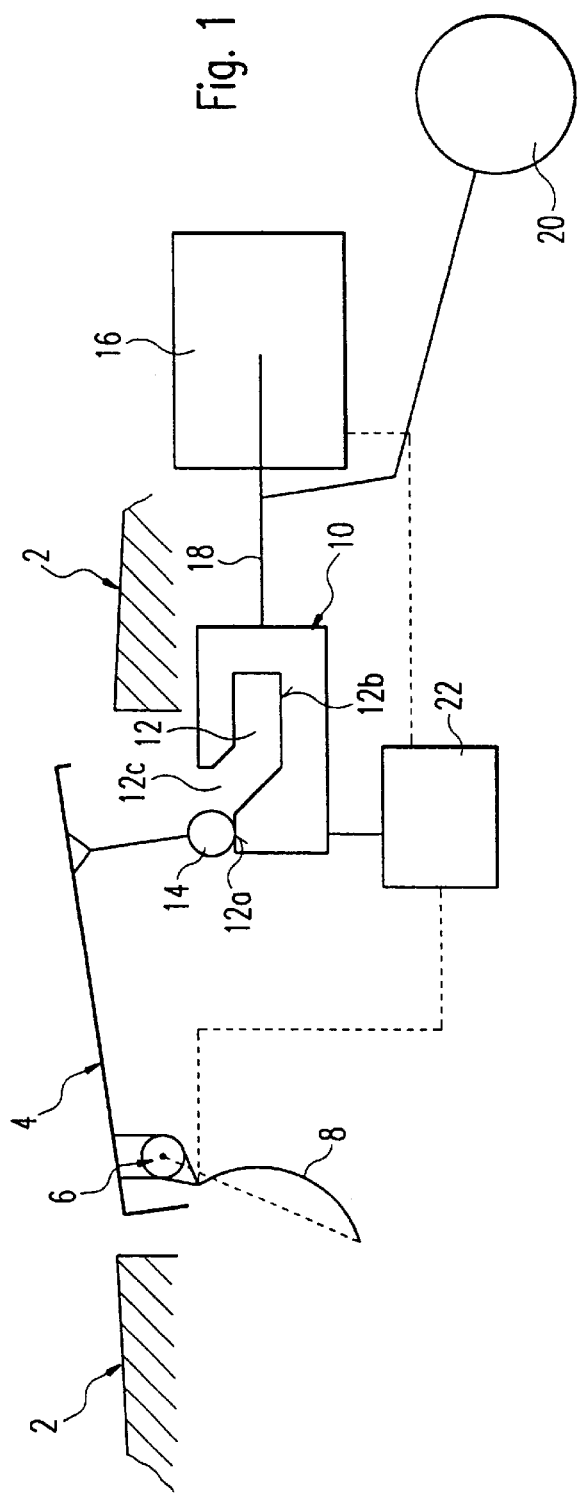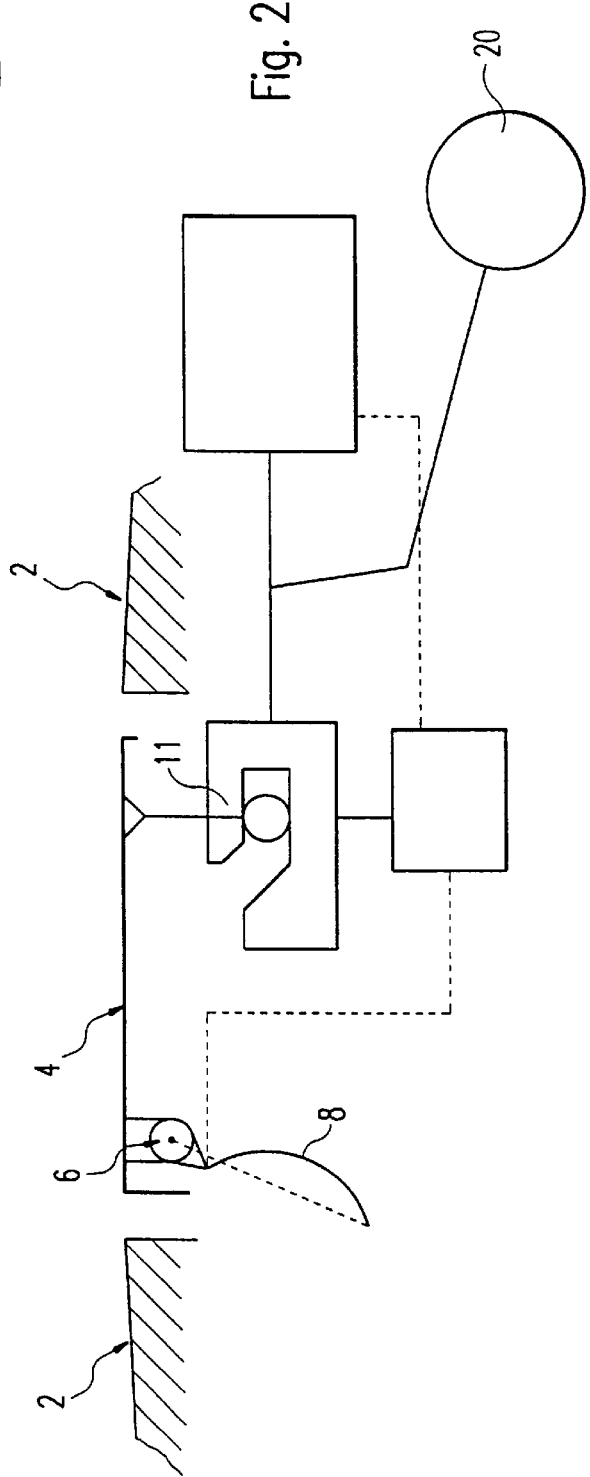

FILLER INLET COMPARTMENT LID OPERATING SYSTEM

This application claims the priority of German application 100 23 382.1, filed May 12, 2000, the disclosure of which is expressly incorporated by reference herein.

BACKGROUND AND SUMMARY OF THE INVENTION

The present invention relates to an operating system for a filler inlet compartment lid of a motor vehicle.

Corresponding to design data, the filler inlet compartment lids of current passenger cars are constructed without recessed grips for opening purposes. A mechanism is mounted behind the rearward edge of such a filler inlet compartment lid. After manual pressure from the outside, the mechanism presses the filler inlet compartment lid, during release, approximately 1 cm toward the outside into an intermediate position so that the user can reach behind the edge of the filler inlet compartment lid which will then protrude. After refueling the vehicle, the lid is pressed into the closed position again, against the resistance of the mechanism. When released, the lid will spring only so far to the outside that it is flush with the outer skin. The operation of this system is similar to that of a pressure-operated ball point pen having a cardioid curve or operating according to similar principles.

For reasons of comfort, the triggering force for the above-described pressing mechanism should not exceed a certain amount. There is, therefore, a risk that this mechanism will be triggered in car wash systems. After passing through a car wash system, the filler inlet compartment lid may protrude in the intermediate position. The vehicle user often does not notice this and will drive around with a slightly projecting compartment lid until the projecting lid is noticed. Only after pressure is exercised on the filler inlet compartment lid will this lid be returned into a position flush with the outer skin. Also, if the customer forgets to completely press in the compartment lid after refueling, then the lid will slightly protrude.

It is an object of the invention to provide a system which automatically closes the filler inlet compartment lid if it either has opened in an unintentional manner or was mistakenly not closed.

This object is achieved by using a control unit which responds to signals indicating predefined conditions and which is designed to control the operating system for closing the filler inlet compartment lid. Further features of the invention are also reflected in the claims.

In a system according to the invention, signals are generated under defined conditions such as, for example, after expiration of a predefined time interval following the opening of the filler inlet compartment lid, after a predefined driven distance following a refueling stop, when a predefined speed is exceeded, or under other conditions which can be evaluated as signs that the refueling operation is completed. These signals trigger closing and locking of the filler inlet compartment lid. In this manner, driving around with an accidentally not closed filter inlet compartment lid, in a fully opened or intermediate position, is prevented.

An expedient further development of the invention is that the operating system arranged inside the vehicle body, similar to a central locking system, has a sliding-block part which can be rotated or displaced by a driving element. The sliding-block part has a guide slot which is open on one side and defines two levels. A locking pin can engage into the guide slot. The locking pin is situated on the filler inlet compartment lid and, depending on the position of the sliding-block part, locks the filler inlet compartment lid in the closed position or moves it into a slightly lifted release or intermediate position in which, as mentioned above, the lid can easily be opened manually. Triggering of the sliding-block drive can take place by way of a pressure sensor which, during a slight pressure against the closed filler inlet compartment lid, generates an opening signal which causes a movement of the sliding block into the position in which the filler inlet compartment lid is lifted and is released for opening. After closing the filler piece when the refueling operation is completed, the filler inlet compartment lid, which is normally provided with a dead-center spring, is shut and reaches the slightly opened intermediate position, in which it can again trigger a sensor, which will trigger the sliding-block drive for moving the sliding block into the locking position for the filler inlet compartment lid.

If opening of the filler inlet compartment lid is triggered unintentionally (for example, in a car wash system), or if the filler inlet compartment lid is only leaning, after a closing operation, without triggering the sensor, or remains completely open, then the lid will be automatically closed at a later point in time according to the invention as a function of certain signals, mentioned above by way of example, available in the vehicle. If desired, another signal generator can be provided to indicate the respective position of the sliding block or filler inlet compartment lid on the dashboard. The invention has the advantage that a customer will not be driving around with a projecting filler inlet compartment lid without noticing it after either using a car wash system or refueling. After a defined time or driving distance, or as a function of other conceivable events or conditions, the filler inlet compartment lid will be closed electrically or by another drive (hydraulically, pneumatically, etc.). Advantageously, the entire unit for automatically closing the filler inlet compartment lid can be combined to form a module which can easily be mounted in the vehicle body and connected.

Embodiments of invention illustrated in the drawings will now be explained in detail.

BRIEF DESCRIPTION OF THE DRAWINGS

FIG. 1 is a symbolic diagram of the operating system for a filler inlet compartment lid with a displaceable sliding block in the unlocked condition of the filler inlet compartment lid according to the invention;

FIG. 2 is a view of the arrangement according to FIG. 1 in the locked condition;

DESCRIPTION OF THE PREFERRED EMBODIMENTS

Figure 3:
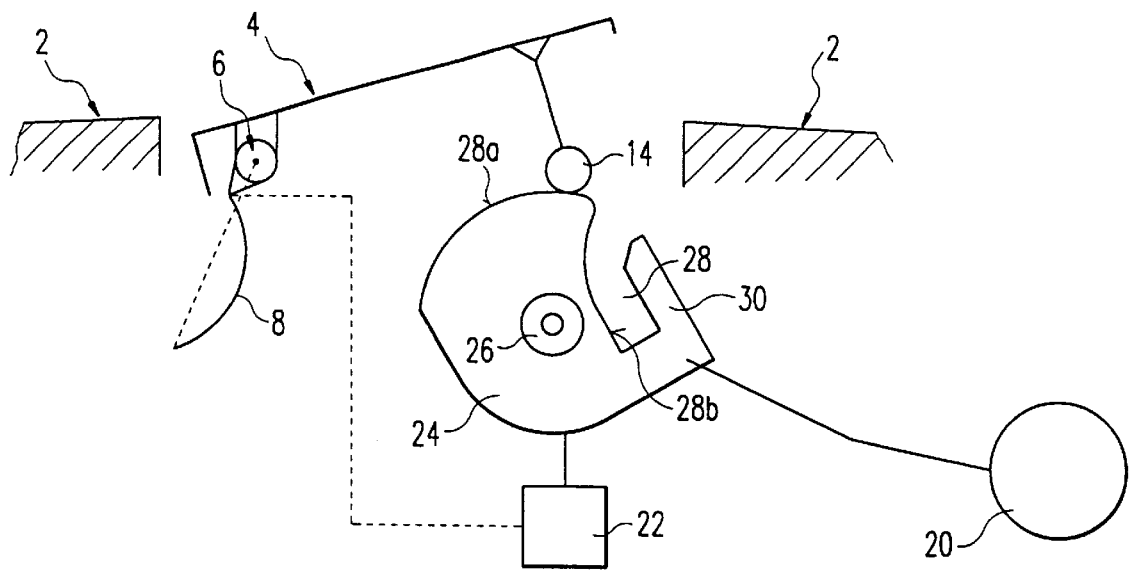
FIG. 3 is a view of a variant of the system according to the invention with a rotatable sliding block in the unlocked position.

A filler inlet compartment lid 4 is sunk in the outer skin 2 of the vehicle body. This filler inlet compartment lid 4 is conventionally swivellably disposed by way of a hinge 6, so that it can be opened up for refueling and then closed again. In a known manner, a dead-center spring 8 is used for fixing the filler inlet compartment lid in the closed and in the opened position. With a central locking system, an electrically or pneumatically operable locking pin would be provided for locking the filler inlet compartment lid. When the vehicle is locked, the locking pin moves into an eye provided on the filler inlet compartment lid and locks the lid in this manner.

Instead, the invention provides a sliding block slide or rotor which is capable of both keeping the filler inlet compartment lid locked in the closed condition or releasing it for opening and pulling the lid from a slightly open intermediate position, in which it can be completely opened manually, into the completely closed position, in which it closes off flush with the vehicle body skin.

In the embodiment illustrated in FIG. 1, the sliding block 10 has a sliding-block slot 12, which defines two planes 12a and 12b. The upper plane 12a is for releasing and the lower plane 12b is for locking the filler inlet compartment lid 4. A slot opening 12c permits entry of a locking pin 14 connected with the filler inlet compartment lid into the sliding-block slot. The sliding block 10 can be pushed back and forth between two end positions, which are illustrated in FIGS. 1 to 2, by a driving element 16. The driving element 16 can be formed, for example, by a spring-loaded solenoid whose armature is connected with the sliding block 10 by way of a connecting rod 18. In the illustrated embodiment, an emergency unlocking system 20 is applied to the rod 18. The sliding block 10 can also be moved manually by the emergency unlocking system 20.

If, after refueling, the filler inlet compartment lid 4 has been manually pressed in the direction of its closed position, then its locking pin 14, according to FIG. 1, will be disposed on the upper plane 12a of the sliding-block slot 12. A pressure sensor, which is not shown here separately and which may be contained, for example, in a control unit 22, detects this half-closed condition of the filler inlet compartment lid, and will then emit a closing command to the driving element 16 which slides the sliding block 10 into the position illustrated in FIG. 2. In this case, the locking pin 14 enters completely into the sliding block slot 12 and, in the left end position of the sliding block, is held therein by a locking hook 11, which bounds the slot on the other side. This is directly demonstrated in FIG. 2. In this case, the filler inlet compartment lid 4 moves into its completely closed position.

In the area of the hinge 6, a sensor is provided. The sensor, not shown here, supplies information concerning the lid position to the control unit 22 in order to indicate when the lid is open or not completely closed. When additional predefined condition signals occur, for which several examples were initially indicated, the control unit 22 will initiate closing of the filler inlet compartment lid. In the illustrated embodiment, the driving element 16 moves the sliding block 10 toward the left and thus pulls the filler inlet compartment lid 4 shut. If the filler inlet compartment lid is completely open, another mechanism, which is not shown here separately, can be provided. This other mechanism first brings the filler inlet compartment lid into the position according to FIG. 1, from which the lid is then completely closed in the manner described above.

Figure 4:
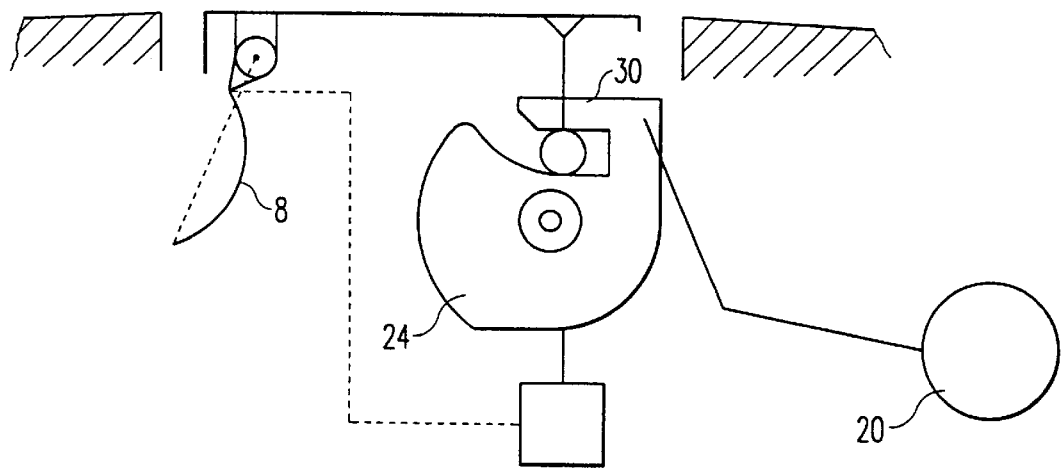
FIG. 4 is a view of the arrangement according to FIG. 3 in the locked position.

In the embodiment illustrated in FIGS. 3 and 4, the sliding block is constructed as a rotatable sliding block 24 which can be rotated by a rotary driving element 26. The sliding block 24 has a sliding-block slot 28 which, corresponding to the rotating movement of the sliding block 24, is shaped in the manner of a cam and has an upper cam surface 28a as well as a lower cam surface 28b, which correspond to the planes 12a and 12b of the slot 12 of the displaceable sliding block 10 according to FIGS. 1 and 2. The locking pin 14 slides on these cam surfaces in a way corresponding to FIG. 1. On the side opposite the lower cam surface 28b, the slot 28 is bounded by a locking hook 30 which holds the locking pin 14 and thus the filler inlet compartment lid 4 in the locked position according to FIG. 4. This also corresponds to the variant according to FIGS. 1 and 2, in which the locking hook 11 is situated opposite the lower plane 12b.

The system according to the invention is created for simple opening and, under certain conditions, automatic closing of the filler inlet compartment lid. The opening of the lid takes place by way of pressure on the lid, which transmits the pressure to a switching unit which can be separate from or be integrated in the driving unit. This switching unit is controlled either directly, by the rotatable or linearly displaceable sliding block, or indirectly, by the locking rod in the driving unit. Controlling can take place, in the locking and release conditions of the sliding block, so that opening and closing can take place by way of the switching unit.

Two Operating Sequences will be Mentioned:

1st Operating Sequence Possibility:

Opening of the Filler Inlet Compartment Lid

The lid opens a distance, the lid edge can comfortably be opened manually against a slight counterpressure of the spring 8, and the lid opens automatically after the dead center is exceeded.

Closing of the Filler Inlet Compartment Lid

The lid 4 is to be closed manually against a slight counterpressure of the spring 8 until, after the dead center, it automatically falls into the easily opened intermediate position, and the pressure generated by the impact is to trigger the control unit 22 by way of a sensor and control the locking.

a) By pressing onto the lid, the control unit is triggered and the locking is controlled; and b) if the lid is not closed, and, for example, engine on and/or rolling movement conditions apply, an automatic closing operation is initiated.

2nd Operating Sequence Possibility:

Opening of the Filler Inlet Compartment Lid

Pressing of the lid is performed, and the lid opens completely.

Closing of the Filler Inlet Compartment Lid

The lid is to be closed manually against a slight counterpressure of the spring until it engages; and if the lid is not closed and, for example, engine on and/or rolling movement conditions apply, an automatic closing operation is initiated.

In the event of a failure of the driving system, the lid can be opened by an emergency unlocking system 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An operating system for a filler inlet compartment lid of a motor vehicle, comprising a control unit which responds to signals indicating predefined conditions and designed for controlling the operating system for closing the filler inlet compartment lid, and a sliding-block part which is arranged inside a vehicle body, which can be rotated or displaced by a driving element, and which has a guide slot, open on one side and defining two levels, and a locking pin mounted on the filler inlet compartment lid which can enter the guide slot, the locking pin, according to the position of the sliding-block part, locking the filler inlet compartment lid in a closed position or moving the filler inlet compartment lid into a slightly lifted intermediate position.

2. The operating system according to claim 1, and further comprising a pressure sensor, which responds to a pressure on the filler inlet compartment lid when the lid is closed, for controlling the driving element for the sliding-block part in order to bring the sliding-block part into a position in which the filler inlet compartment lid takes up the intermediate position.

3. The operating system according to claim 1, and further comprising a pressure sensor which can be operated in the intermediate position of the filler inlet compartment lid for generating a filler inlet compartment lid closing signal for the driving element.

4. The operating system according to claim 1, wherein when one of the signals indicating predefined conditions occurs, the driving element moves the sliding-block part into a locking position.

5. The operating system according to claim 1, and further comprising a closing drive which changes the filler inlet compartment lid from its completely opened position into the intermediate position.

6. The operating system according to claim 1, wherein the sliding-block part with its driving element, the control unit, and sensors are combined to form a module which can be mounted as one unit.

7. The operating system according to claim 5, wherein the sliding-block part with its driving element, the control unit, and sensors are combined to form a module which can be mounted as one unit.

8. The operating system according to claim 7, wherein the closing drive is also combined with the driving element, the control unit, and the sensors to form the one unit.

* * * * *